United States Patent [19]

Ford et al.

[11] Patent Number: 5,671,657
[45] Date of Patent: Sep. 30, 1997

[54] MULTIPLE HOPPER GRINDER

[75] Inventors: David F. Ford, Springfield; Daniel R. Ephraim, Glencoe, both of Ill.

[73] Assignee: Bunn-O-Matic Corporation, Springfield, Ill.

[21] Appl. No.: 759,474

[22] Filed: Dec. 5, 1996

[51] Int. Cl.⁶ .......... A47J 31/42; A47J 42/16; A47J 42/50; B02C 19/00
[52] U.S. Cl. .......... 99/286; 99/287; 99/289 R; 99/290; 241/36; 241/100
[58] Field of Search .......... 99/509–511, 284, 99/286, 287, 289 R, 290, 295, 299–316; 241/34, 36, 37.5, 100, 199.12, 259.1, 261.2, 261.3; 426/433, 231

[56] References Cited

U.S. PATENT DOCUMENTS

| | | | |
|---|---|---|---|
| 3,827,640 | 8/1974 | Marrie | 241/100 |
| 4,786,001 | 11/1988 | Ephraim et al. | 241/101.8 |
| 4,789,106 | 12/1988 | Weber | 241/101.2 |
| 4,967,649 | 11/1990 | Ephraim et al. | 99/286 |
| 4,971,259 | 11/1990 | Nidiffer | 241/34 |
| 5,058,814 | 10/1991 | Ephraim et al. | 99/286 X |
| 5,123,572 | 6/1992 | Ford | 241/100 X |
| 5,134,925 | 8/1992 | Bunn et al. | 99/289 R |
| 5,230,278 | 7/1993 | Bunn et al. | 99/307 X |
| 5,255,593 | 10/1993 | Bunn et al. | 99/305 X |
| 5,303,639 | 4/1994 | Bunn et al. | 99/300 X |
| 5,309,819 | 5/1994 | Ford | 99/289 R |
| 5,386,944 | 2/1995 | Knepler et al. | 241/36 X |
| 5,465,650 | 11/1995 | Friedrich et al. | 99/286 |

Primary Examiner—Timothy F. Simone
Attorney, Agent, or Firm—Trexler, Bushnell, Giangiorgi & Blackstone, Ltd.

[57] ABSTRACT

A dispensing control assembly for use with a grinding apparatus to controllably dispense coffee beans therethrough. The grinding apparatus includes a hopper in gravity feed relationship with the dispensing control assembly and a grinder positioned below the dispensing control assembly for grinding material dispensed therethrough. The dispensing control assembly includes a slide plate retained between the hopper and the grinder for selective movement between an open and a closed position. A moving mechanism is provided and coupled to the slide plate for moving the slide plate between the open position and the closed position. A baffle is also provided which extends over a portion of the slide plate facing the hopper with the baffle creating a void therebelow to facilitate movement of the slide plate into the closed position and avoid trapping coffee beans.

15 Claims, 2 Drawing Sheets

MULTIPLE HOPPER GRINDER

BACKGROUND

The present invention relates to material grinders for grinding substances such as coffee beans to produce ground coffee. More specifically, the present invention is directed to a dispensing control assembly for use with a coffee grinder which provides controllable dispensing of coffee beans from a hopper into a grinder assembly and prevents interference when dispensing beans from a hopper into the grinder mechanism.

A variety of devices have been produced for grinding materials. More specifically, the present invention pertains to the grinding of coffee beans for use in producing ground coffee. As such, reference will be made to materials to be ground as coffee beans and the ground material produced by such a grinder as ground coffee. However, it will be appreciated that a variety of substances may be ground in such a grinder and benefit from the novel features of the present invention.

A variety of grinders have been produced to grind coffee beans into a ground coffee substance. In recent years, it has become increasingly popular for restaurants, franchise operations and other food service institutions to serve fresh brewed coffee made from fresh ground coffee beans. Such coffee grinding devices have been produced in response to this demand for fresh ground coffee beans. The popularity also has created an increasing demand for coffee bean grinders which have increased efficiency and reliability. A variety of coffee grinders are available from a variety of manufacturers which store a large quantity of beans for dispensing into a grinding mechanism. In many settings, one grinder will be used to grind both regular coffee beans and decaffeinated coffee beans. These dual purpose grinders include two hoppers and a dispensing control assembly for selectively dispensing beans from one of the hoppers.

Most grinders provide structures for retaining a brewing funnel or receptacle near the outlet grinder so as to catch the grounds as they are dispensed from the grinder. User selectable controls are provided to allow the user to select a predetermined quantity of coffee. As such, there is a well developed coffee grinder art. In particular, the assignee of the present invention has received patents on dual hopper coffee grinders which grind coffee as well as grind and brew coffee.

More specifically, reference is made to U.S. Pat. No. 4,971,259 issued Nov. 20, 1990 to Nidiffer assigned to Bunn-O-Matic Corporation, subsequently reexamined and issued as reexamination Certificate No. B 14,971,259 issued Apr. 30, 1996 to Nidiffer and assigned to Bunn-O-Matic Corporation. Additionally, reference is made to U.S. Pat. No. 3,827,640 issued Aug. 6, 1974 to Marrie and assigned to Societe Anonyme Dite "ETUD" which shows a coffee grinder having a grinder motor positioned in a coffee hopper thus suspending a grinding mechanism below the hoppers in the a gravity flow path of the coffee beans. Further reference is made to U.S. Pat. Nos. 4,967,649 issued Nov. 6, 1990 and 5,058,814 issued Oct. 22, 1991 to Ephraim et al. and assigned as of the date of issue to Modem Process Equipment, Inc. Finally, U.S. Pat. No. 5,465,650 issued Nov. 14, 1995 to Friedreich et at. and assigned to Bunn-O-Matic Corporation shows a dual hopper coffee grinder which is provided in combination with a coffee brewer.

One of the areas which may be improved in the prior art devices is the ability to control the flow of beans from a hopper into a grinding chamber. In general, many grinders have a hopper positioned in gravity feed relation with the hoppers to dispense coffee beans to a grinding chamber positioned therebelow. A dispensing control assembly is positioned between the hopper and the grinding chamber to control the dispensing of coffee beans therethrough. As shown in U.S. Pat. No. 4,971,259 to Nidiffer (Nidiffer '259) the discharge control assembly includes a pair of sliding gates. Each sliding gate is associated with a hopper to dispense coffee beans from the hopper into a common grinding chamber. As such, the Nidiffer device provides a dual hopper coffee grinder with two hoppers for containing supplies of two different types of coffee beans and is capable of being operated to dispense and grind different size batches of ground coffee from either of the two types of coffee beans contained in the hoppers. Each of the slides is reciprocally shiftable to dispense beans from the corresponding hopper into the grinding chamber. Additionally, Nidiffer '259 selectively shifts each of the slide gates from a closed position to an open position for a preselected time. The preselected time is set in order to dispense a predetermined quantity of coffee beans associated with the time rate flow.

Another consideration in the prior art grinders is the ability to provide an over grind time. An over grind time period is used after the dispensing control assembly is operated to the closed position so that the grinder can clean out coffee beans remaining in the grinder chamber. In this manner, a grinder employing such over grind time techniques will prevent the mixing of different types of beans and prevent the accumulation of beans in the grind chamber.

It will be desirable to improve upon the prior art devices by providing a dispensing control assembly which provides greater reliability in the closure of the opening between the hopper and the grinding chamber. It is possible, using the prior devices mentioned hereinabove, that a coffee bean may be trapped between the closing mechanism of the dispensing control assembly and an opposing leading edge of the opening. As such, this may allow additional beans to trickle through a gap between the closure mechanism and the leading edge.

This will be undesirable, for instance, where regular beans trickle through into a decaffeinated bean flow. Such mixing of beans may result in introducing caffeine into coffee accidentally. Additionally, this situation will be undesirable when different types of flavored beans are stored in the hoppers. Flavored beans typically provide rather aromatic flavors to the coffees. As such, even a small quantity of flavored beans introduced into a regular coffee bean grind may produce such aromatic flavors. While such aromatic flavors are highly desirable in the favored coffee, they may be highly undesirable in regular unflavored coffee.

It is also undesirable, for instance, where either type of beans trickle through an opening thereby allowing beans to fill the chamber during the over grind time mentioned hereinabove. As mentioned, the over grind time clears any coffee beans from the grind chamber. If beans are allowed to trickle into the chamber during the over grind time, additional beans will be ground and as such the quantity of ground coffee produced will be inaccurate. The inaccurate quantity of ground coffee will affect the flavor of the coffee beverage produced therefrom. Additionally, the trickling of beans into the grind chamber is imprecise and as such will also produce an undesirable inconsistent cup of coffee.

As such, it would be highly desirable to provide a coffee grinding apparatus which provides greater and improved reliability in assuring that beans are not permitted to accidentally flow from one hopper when beans from another hopper are being dispensed.

OBJECTS AND SUMMARY

An object of the present invention is to provide improved reliability and assurance to prevent mixing of different types of coffee beans from a dual hopper coffee grinder.

Another object of the present invention is to provide an improved dispensing control assembly for use with a coffee grinder having a hopper in a gravity feed relationship with a grinding chamber.

Still a further object of the present invention is to provide a dispensing control assembly for use with a dual hopper coffee grinder which prevents beans from becoming trapped between a movable plate and a leading edge of an opening which the plate covers in the normally closed position.

Briefly, and in accordance with the foregoing, the present invention envisions a dispensing control assembly for use with a grinding apparatus to controllably dispense coffee beans therethrough. The grinding apparatus includes a hopper in gravity feed relationship with the dispensing control assembly and a grinder positioned below the dispensing control assembly for grinding material dispensed therethrough. The dispensing control assembly includes a slide plate retained between the hopper and the grinder for selective movement between an open and a closed position. A moving mechanism is provided and coupled to the slide plate for moving the slide plate between the open position and the closed position. A baffle is also provided which extends over a portion of the slide plate facing the hopper with the baffle creating a void therebelow to facilitate movement of the slide plate into the closed position and avoid trapping coffee beans.

BRIEF DESCRIPTION OF THE DRAWING

The organization and manner of the structure and function of the invention, together with further objects and advantages thereof, may be understood by reference to the following description taken in connection with the accompanying drawings, wherein like reference numerals identify like elements, and in which.

DESCRIPTION

Figure 1:
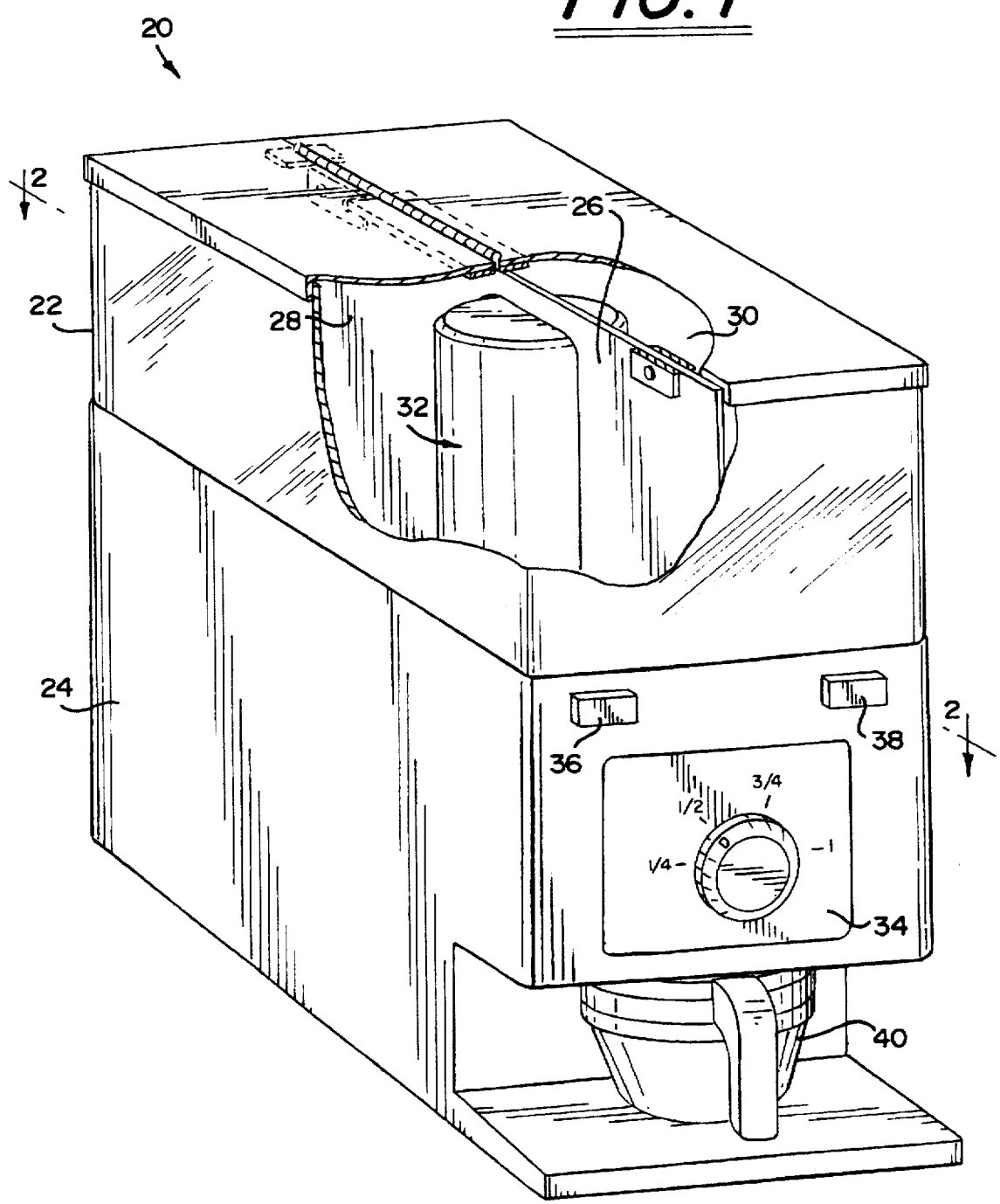
FIG. 1 is a partial fragmentary, perspective view of a grinding apparatus or grinder showing the basic overall configuration or structure of the grinder having a first hopper chamber and a second hopper chamber.

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

FIG. 1 shows a coffee grinding apparatus or grinder 20 having an upper hopper portion 22 and a lower housing portion 24. Coffee beans are retained in the upper hopper portion 22 and gravity fed to a grinding mechanism (not shown) of known construction such as that as generally shown and described in U.S. Pat. No. 4,971,259 issued Nov. 20, 1990 to Nidiffer, reexamination certificate No. B14,971, 259. As shown in FIG. 1, a portion of the grinder has been broken away from the hopper 22 to show that the hopper includes a divider 26 which defines a first hopper chamber 28 and a second hopper chamber 30 retained therein.

A grinder motor 32 is positioned in the hopper 22 with the divider 26 passing therearound. The grinder configuration is similar to that as shown in U.S. Pat. No. 3,827,640 issued Aug. 6, 1974 to Marrie. In Marrie '640 it is shown that a motor can be positioned in the hopper chamber with the grinding burr driven thereby positioned below the hoppers. In the present application, it is desirable to provide two chambers for containing whole bean coffee which may include a combination of: two different flavors of whole bean coffee; a regular coffee and a decaffeinated coffee; or different types of roasts of beans. Other combinations to fill the two hoppers may be used within the scope of the present invention.

The grinder 20 includes a control mechanism which allows the grinder to be set for a brew quantity by means of a volume control 34 which will then grind the desired quantity for such volume of coffee by activating a perspective start button 36, 38. Whole bean coffee passes the selected hopper depending on which activation switch is employed 36, 38 and ground through the grinding mechanism and dispensed into a waiting brew funnel 40. In accordance with the teachings of U.S. Pat. No. 5,186,399 issued Feb. 16, 1993 to Knepler et al, assigned to the assignee of the present invention, it is desirable to provide an overgrind time to remove beans from the grinding chamber to remove coffee beans from the grinding chamber and prevent mixing of the two types of the beans in the grinder.

Figure 2:
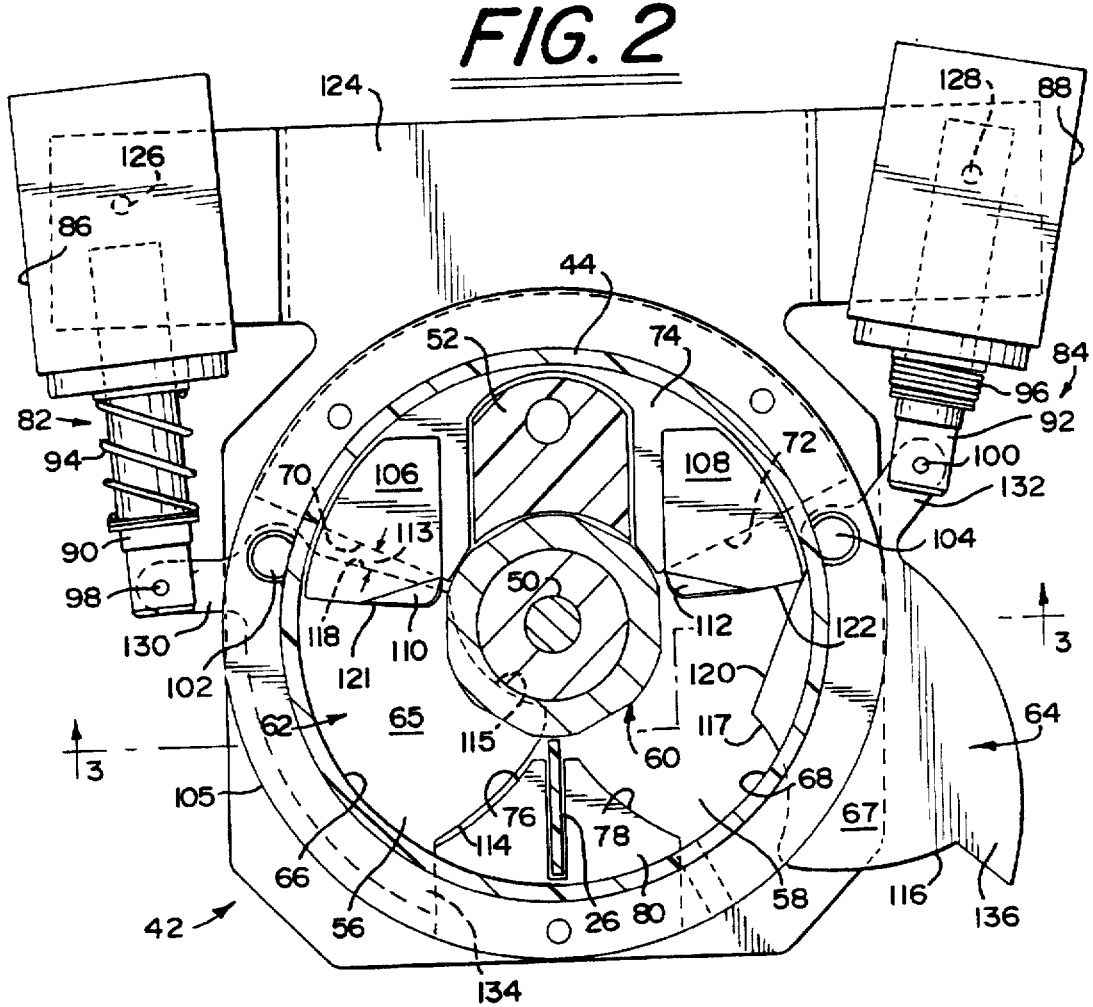
FIG. 2 is a diagrammatic, partial fragmentary, partial cross-sectional plan view taken along line 2—2 in FIG. 1 and in which upper portions of the first and second hoppers and a housing portion of the grinder has been removed in the interest of clarifying the subject matter of the present invention.
Figure 3:
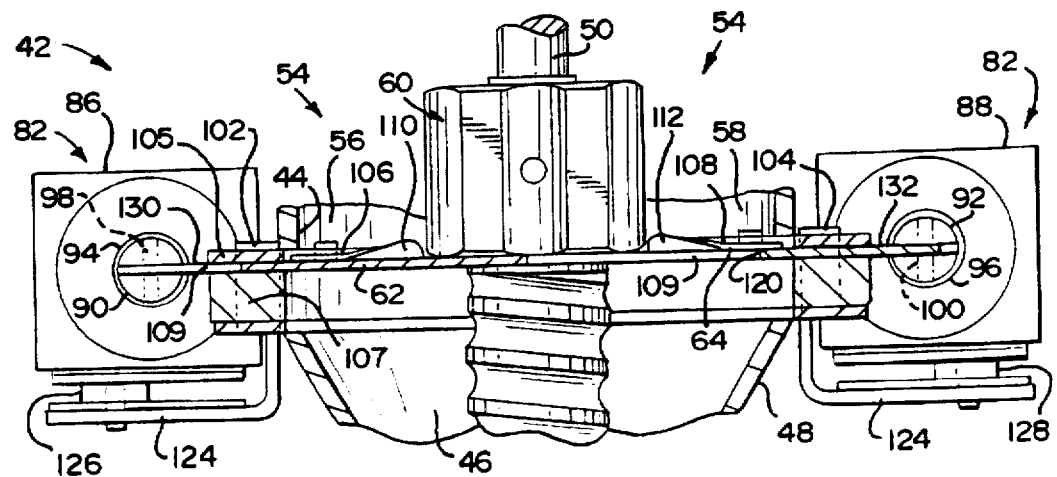
FIG. 3 is a partial fragmentary, cross-sectional side elevational view taken along line 3—3 in FIG. 2 showing additional structures of the present invention.

The present invention more specifically focuses on a dispensing control assembly 42 as shown in FIGS. 2 and 3. The dispensing control assembly 42 is positioned below the hopper 22 as indicated by a hopper wall 44 as shown in FIG. 3 and above a grinding chamber 46 as indicated by a burr housing wall 48 also in FIG. 3. With reference to FIG. 1, the grinder mechanism 32 is positioned in the hoppers with a drive shaft 50 (see FIGS. 2 and 3) extending downwardly therefrom. The drive shaft 50 is attached to a grinder burr (burr is not shown) of a known construction. A motor body 51 of the grinding mechanism 50 is suspended above the grinding chamber 46 on a motor support 52.

A portion of the hopper divider 26 extends downwardly to divide a dispensing chamber area 54 defined by the hopper wall 44. The dispensing chamber area 54 is the area immediately above the dispensing control assembly 42 defined by the hopper wall 44 extending downwardly in close position thereto. As such, the dispensing chamber area 54 is divided into a first dispensing chamber area or first chamber 56 and a second dispensing chamber area or second chamber 58. The chambers 56, 58 are defined by an area bounded by the inside surface of the hopper wall 44, an abutting surface of the hopper divider 26, abutting surfaces of the motor support 52 and the outside surface of an agitator 60 retained on the motor shaft 50. The motor support 52 and the hopper divider 26 are sized and dimensioned to be positioned in close proximity to the agitator 60 without actually touching the agitator 60. In this manner, the agitator 60 can rotate on the motor shaft 50 through both chambers 56, 58 while preventing coffee beans from being caught between opposing surfaces of the motor support 52 and the hopper divider 26 due to the small dimension therebetween.

Having now divided the coffee bean flow between two different types of coffee beans, attention is now directed to dividing the coffee bean flow between two different areas, namely, the hopper or bean storage areas 28, 30 and the grinding chamber 46. The dispensing control assembly 42 controllably dispenses a desired quantity of coffee beans from a selected hopper 28,30. Each chamber 56,58 is controllably closed from dispensing coffee beans into the grinding chamber 46 by means of a corresponding slide plate positioned therebetween. A first slide plate 62 is positioned between the first chamber 56 and the grinding chamber 46. A second slide plate 64 is positioned between the second chamber 58 and the grinding chamber 46. As shown in FIG. 2, the first slide plate 62 is positioned to prevent coffee bean flow from the first hopper 28 to the grinding chamber 46. As also shown in FIG. 2, the second slide plate 64 has been displaced to facilitate bean flow from the second hopper 30 to the grinding chamber 46. Each plate 62,64 defines a fanned portion 65,67 which moves between an open position and a closed position.

With further reference to FIG. 2, it can be seen that a first dispensing passage 66 and a second dispensing passage 68 are defined by corresponding edges 70,72 of a filler plate 74, corresponding edges 76,78 of a spacer 80 and the outside surfaces of the agitator 60. The spacer 80 helps retain the hopper divider 26 for dividing the first and second chambers 56,58. The first and second dispensing passages 66, 68 are opened and closed by the slide plates 62,64 to control the flow of coffee beans from the corresponding hoppers 28,30 to the grinding chamber 46.

Moving mechanisms 82,84 are coupled to each slide plate 62,64, respectively. In the embodiment as shown in the illustrations, the moving mechanisms 82,84 include solenoids 86,88 of known construction having moveable plungers 90,92, respectively. Return springs 94,96, respectively, are positioned on each plunger 90,92. When each of the solenoids 86,88 is activated, the plunger 90,92 is retracted. Retraction of the plunger 90,92 overcomes the spring force on the spring 94,96 to compress the spring 96 as shown in the energized solenoid 88 of the moving mechanism 84. In the deenergized solenoid 86 as shown in moving mechanism 82, the solenoid 86 is deenergized and as such, the spring 94 extends the plunger 90 from the solenoid 86.

The solenoids 86,88 are attached to the slide plates 62,64 at a pivot point 98,100. A separate slide plate pivot point 102,104 stationarily fixes the slide plates 62,64 to a retaining ring 105 and a mounting ring 107 positioned externally of the dispensing chambers 56,58 and the grinding chamber 46. A gap 109 is defined between the retaining ring 105 and the mounting ring 107 to provide an area for movement of the slide plates 62,64. The gap 109 is maintained by positioning the filler plate 74 and spacer 80 between the retaining ring 105 and the mounting ring 107.

The slide plate pivot points 102,104 allow the respective plates 62,64 to pivot relative thereto. As shown in FIG. 2, when the moving mechanism 84 is energized, the slide plate 64 is pivoted outwardly to open the second dispensing chamber 58 and place it in communication with the grinding chamber 46. As such, the second dispensing passage 68 is opened allowing coffee beans to flow therethrough. When the solenoid 86 is deenergized as shown in the moving mechanism 82, the slide plate 62 is positioned to cover the corresponding passage 66 to prevent coffee beans passing from the dispensing chamber 56 into the grinding chamber 46.

An important feature of the present invention is that a baffle 106,108 is positioned in each dispensing area 56,58 extending over a portion of the corresponding dispensing passage 66,68, respectively. Each baffle 106,108 includes an upturned edge 110,112. As more clearly shown in FIG. 2, the baffles 106,108 are attached to the filler plate 74 and extend away from the respective edges 70,72 and over a portion of the respective slide plates 62,64. The upturned edges 110, 112 help promote displacement of coffee beans away from the plate 62,64 and baffles 106,108 as the plate is moved from an open position to a closed position. An angle of the edge 110,112 causes coffee beans between the edge 110,112 and the leading edge 118,120 of the plate 120 to be pushed downwardly, thus preventing the beans from being trapped. Additionally, the upturned edges 110,112 are spaced away from the pivot points 102,104. As the plates 62,64 close, beans caught between the leading edges 118,120 and the baffles 106,108 are moved towards the upturned edges 110,112 whereupon they move downwardly into the grinding chamber 46.

The baffles 106,108 cover a gap 113 (as shown on the left side of FIG. 2) between a leading edge 118,120 of each slide plate 62,64 and the corresponding edge 70,72 of the filler plate 74. The gap 113 prevents coffee beans from being trapped between the slide plates 62,64 and the filler plate 74. The baffles 106,108 cover the gap 113 to prevent beans from trickling therethrough. The baffles 106,108 also produce a void thereunder as coffee beans are dispensed through a respective passage 66,68. The void allows the slide plate 62,64 to be positioned to close off the corresponding passage 66,68 when the solenoids of the moving mechanism are deenergized. As noted in the background section, prior art slide plates have a problem in that they may accidentally trap a coffee bean when they are closed, thus preventing full closure of the passage by the slide plate. Partial closure of the passage may result in accidental trickling of coffee beans therethrough which may create inaccurate measurement, as well as contaminate the coffee dispensed from the other hopper.

Additionally, the slide plates 106,108 of the present invention have been specifically designed to promote and optimize the control and dispensing of coffee beans through the passages 66,68. A convex curved front edge 114,116 of the slide plates 106,108 are generally the same curvature as the concave curved edges 76,78 of the spacer 80. Both curves are struck by a radii extending from the pivots 102,104 The curvature of the edges 76,78 and 114,116 facilitates smooth pivoted movement of the plates 62,64 relative to the corresponding pivot points 102,104. A shaft edge 115,117 of the plates 62,64 are curved to facilitate close positioning relative to the shaft 50 when in a closed position. It should be noted that the plates 62,64 extend underneath the agitator 60 to assure closure of the corresponding passages 66,68 and prevent gaps.

As the slide plate 64 moves from the open position to the closed position, any coffee beans passing between the front edges 121,122 of the baffle 108 and the leading edges 118,120 will be scissored toward the agitator 60. As the agitator 60 is rotating on the drive shaft 50 beans are urged toward the rotating agitator 60 and will be moved downwardly into the grinding chamber 46 or displaced slightly upwardly in the correspondingly dispensing chamber. Additionally, the void formed under the flow of coffee beans passing through the passages 66,68 help to assure that no additional coffee beans become trapped between the edge of the filter plate 72 and the leading edge 118,120.

It should be noted that each of the solenoids 86,88 is attached to a solenoid bracket 124 by means of a solenoid pivot point 126,128, respectively. The pivot points 126,128 allow the solenoids 86,88 to pivot while pivoting the respective slide plates 62,64 about the corresponding pivot points 102,104. In use, a solenoid 86,88, when energized,will retract the plunger 90, 92 initiating a pivoting action of the slide plate 62,64 about the corresponding pivot structure 102,104. Because the pivot structures 102,104 are fixed and the solenoid pivot points 126,128 are fixed, a degree of rotary motion occurs between the plunger 90,92 and an extending arm 130,132 of the slide plate 62,64. The extending arm 130,132 provides a lever arm relative to the corresponding pivot structure 102,104 to facilitate pivoting of the slide plate 62,64 relative thereto. The plunger pivot point 98,100 allows for a degree of motion between the plunger 90,92 and the plate 62,64 and also results in pivoting motion of the solenoid 86,88 about the pivot point 126,128.

Similar pivoting motion takes place as the plunger 90,92 extends from the deenergized solenoid 86,88 under the influence of the return spring 94,96. As the slide plate 60,62 is moved into the closed position (see the right side of FIG. 2), a stop portion 134,136 extending from the slide plate 62,64, respectively, abuts the spacer 80 when in the closed position. The stop portions 134,136 are positioned to retain the plates 62,64 and prevent contact between the edges 115,117 and the shaft 50.

While a preferred embodiment of the present invention is shown and described, it is envisioned that those skilled in the art may devise various modifications and equivalents without departing from the spirit and scope of the invention as defined by the appended claims. The invention is not intended to be limited by the foregoing disclosure.

The invention claimed is:

1. A dispensing control assembly for use with a grinding apparatus to controllably dispense substances therethrough; said grinding apparatus including a hopper in gravity feed relationship with said dispensing control assembly and a grinder positioned below said dispensing control assembly for grinding material dispensed therethrough; said dispensing control assembly comprising:

a plate movably retained between said hopper and said grinder for selective movement between an open position and a closed position;

a moving mechanism coupled to said plate for moving said plate between said open position and said closed position;

a baffle extending over a portion of said plate facing said hopper, said baffle to facilitate movement of said plate into said closed position and avoid trapping coffee beans.

2. A dispensing control assembly as recited in claim 1, further comprising:

at least a portion of a leading edge of said baffle overlying said plate being up directed upwardly away from said plate promoting displacement of beans away from said plate.

3. A dispensing control assembly as recited in claim 1, further comprising:

a pivot structure coupled to said plate to facilitate pivoting movement of said plate between an open position and closed position, said plate having a fanned portion and an arm portion, said pivot structure being coupled to said plate intermediate said fanned portion and said arm portion with said arm portion being attached to said moving mechanism, said fanned portion being pivotally moved between a closed position and an open position.

4. A dispensing control assembly as recited in claim 1, further comprising:

said moving mechanism being pivotally attached to said grinder relative to said dispensing control assembly;

said plate being pivotally retained for pivotal movement relative to said baffle; and said moving mechanism being pivotally attached to said plate, wherein actuation of said moving mechanism moves said plate between an opened position and a closed position with pivotal movement between said moving mechanism and said grinder, pivotal movement between said moving mechanism and said plate, and pivotal movement between said plate and said grinder.

5. A dispensing control assembly as recited in claim 1, further comprising:

said moving mechanism including a solenoid having a retractable plunger and a return spring, said plunger being attached to said plate for moving said plate to an open position upon retraction of said plunger thereby allowing beans to flow through the dispensing control assembly, said return spring extending said plunger to return said plate to a closed position upon deenergizing said solenoid.

6. A dispensing control assembly as recited in claim 1, said grinder including two hoppers positioned in gravity feed relationship with said dispensing control assembly, said grinder positioned below said dispensing control assembly independently receiving coffee beans from each of said hoppers for grinding therein, said dispensing control assembly controlling flow of beans from each of said two hoppers, said dispensing control assembly further comprising:

a pair of independently movable plates, each of said pair of plates being associated with a corresponding one of said pair of hoppers, a pair of moving mechanisms with each of said mechanisms being coupled to a corresponding one of said plates for independently moving each said plates.

7. A coffee grinding apparatus for use in grinding coffee beans to produce ground coffee, said grinding apparatus comprising:

a grinding chamber which receives coffee beans therein for grinding;

a pair of hoppers retained in gravity feed relationship relative to said grinding chamber to dispense coffee beans into said grinding chamber;

a dispensing control assembly positioned between said pair of hoppers and said grinding chamber for selectively dispensing coffee beans from said hoppers into said grinding chamber;

said dispensing control assembly including a pair of independently movable plates, each of said plates being associated with a corresponding one of said hoppers, each of said plates being selectively movable between an open position and a closed position for controllably dispensing bean coffee from the corresponding hopper;

a mechanism for moving said plates being coupled thereto for selectively moving each of said plates between an open position and a closed position; and a baffle positioned between each of said plates and said pair of hoppers, each of said baffles facilitating closure of said plate to cease the dispensing of coffee beans from the corresponding hopper.

8. A coffee grinding apparatus as recited in claim 7, further comprising:

a pivot structure coupled to each of said plates and attached to a portion of said grinding apparatus for facilitating pivotal movement of said plate between opened and closed positions.

9. A coffee grinding apparatus as recited in claim 8, further comprising:

each of said slide plates being pivotally attached to said moving mechanism for pivotal movement therebetween.

10. A coffee grinding apparatus as recited in claim 9, further comprising:

said moving mechanism being pivotally attached to a portion of said grinding apparatus for facilitating pivotal movement of said moving mechanism relative to said grinding apparatus.

11. A coffee grinding apparatus as recited in claim 10, further comprising:

said moving mechanism including a solenoid having a dual action plunger and a return spring, said plate being pivotally attached to said plunger, said plunger being retracted by said solenoid to pivot said plate into an open position and said return spring extending said plunger to move said plate into a closed position upon said solenoid being deenergized.

12. A coffee grinding apparatus as recited in claim 7, said coffee grinding apparatus further comprising:

an agitator disposed between said hopper in close proximity to said pair of plates, said agitator agitating beans in said hoppers and flowing through said dispensing control assembly.

13. A coffee grinding apparatus as recited in claim 12, further comprising:

said plate being positioned underneath at least a portion of said agitator for preventing beans from passing between said agitator and said plates when said plates are in a closed position.

14. A coffee grinding apparatus as recited in claim 7, further comprising:

a convex curved front edge on each of said plates; and a spacer positioned between each of said plates, said spacer having concave curved edges correspondingly positioned relative to said convexed curved from edge of each of said plates, a dimension between said concave curved edges and said convexed curved front edge of each of said plates being such as to prevent beans from being caught therebetween or passing therebetween.

15. A coffee grinding apparatus as recited in claim 14, further comprising:

a stop portion of each of said plates extending therefrom for contacting and abutting said spacer, said stop portion limiting movement of said plate in response to operation of said moving mechanism to provide a positive stop point for said plate when moved into the closed position.

\* \* \* \* \*

UNITED STATES PATENT AND TRADEMARK OFFICE
CERTIFICATE OF CORRECTION

PATENT NO. : 5,671,657
DATED : September 30, 1997
INVENTOR(S) : David F. Ford and Daniel R. Ephraim It is certified that error appears in the above-indentified patent and that said Letters Patent is hereby corrected as shown below:

Column 10, Line 12 " from edge" should be -- front edge --

Signed and Sealed this

Third Day of March, 1998

Attest:

BRUCE LEHMAN

*Attesting Officer*   *Commissioner of Patents and Trademarks*